(12) United States Patent
Cahill

(10) Patent No.: US 9,193,225 B2
(45) Date of Patent: Nov. 24, 2015

(54) TIRE INFLATE/DEFLATE INDICATION METHOD AND SYSTEM

(71) Applicant: Goodrich Corporation, Charlotte, NC (US)

(72) Inventor: Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 127 days.

(21) Appl. No.: 14/075,785

(22) Filed: Nov. 8, 2013

(65) Prior Publication Data

US 2015/0134197 A1  May 14, 2015

(51) Int. Cl.
| | |
|---|---|
| *G01M 17/00* | (2006.01) |
| *G06F 7/00* | (2006.01) |
| *G06F 19/00* | (2011.01) |
| *B60C 23/04* | (2006.01) |
| *B60C 23/20* | (2006.01) |

(52) U.S. Cl.
CPC ......... *B60C 23/0476* (2013.01); *B60C 23/0486* (2013.01); *B60C 23/20* (2013.01)

(58) Field of Classification Search
CPC .... G07C 5/008; B60C 23/0476; B60C 23/20; B60C 23/0486
USPC ........................................................ 701/33.7
See application file for complete search history.

(56) References Cited

U.S. PATENT DOCUMENTS

| | | | |
|---|---|---|---|
| 2006/0144997 A1* | 7/2006 | Schmidt et al. | 244/100 R |
| 2006/0212193 A1 | 9/2006 | Breed | |
| 2007/0159314 A1* | 7/2007 | Zhu | 340/442 |

FOREIGN PATENT DOCUMENTS

| | | |
|---|---|---|
| FR | 2535846 | 5/1984 |
| WO | 2010042957 | 4/2010 |

OTHER PUBLICATIONS

Extended European Search Report dated Mar. 24, 2015 in European Application No. 14191738.5.

* cited by examiner

*Primary Examiner* — Calvin Cheung
*Assistant Examiner* — Paula L Schneider
(74) *Attorney, Agent, or Firm* — Snell & Wilmer, LLP

(57) ABSTRACT

Systems and methods for indicating conditions for the appropriate inflation and/or deflation of tires are disclosed. Some systems and methods include measuring a variable affecting the internal gas temperature of a tire, calculating by the processor an estimated internal gas temperature of a tire, and determining whether a tire is appropriate to inflate and/or deflate.

5 Claims, 5 Drawing Sheets

TIRE INFLATE/DEFLATE INDICATION METHOD AND SYSTEM

FIELD OF INVENTION

The present disclosure relates to indication methods and indication systems for the appropriate inflation and/or deflation of tires.

BACKGROUND OF THE INVENTION

The inflation of tires on vehicles (e.g., aircraft) can often be a hazardous activity, which if not done properly, can result in decreased tire life, premature failure, and/or the destruction of property.

Accurate and precise estimation of the appropriate internal pressure of tires can be difficult given the heating and cooling of gas contained in a tire. The appropriate internal pressure of a tire can be difficult to predict because of the relationship between wheel temperature, tire temperature, and ambient temperature.

SUMMARY OF THE INVENTION

Systems and methods disclosed herein may be useful in tire maintenance methods and systems. In various embodiments, systems are provided comprising a system comprising a processor configured to be in at least one of electrical communication and radio frequency (RF) communication with a sensor, wherein the sensor is configured to sense a variable affecting an internal gas temperature of a tire, wherein the processor is configured to receive the variable, wherein the processor is configured to calculate an estimated internal gas temperature of the tire, and wherein the processor is configured to determine whether the tire is appropriate to at least one of inflate and deflate.

Methods disclosed include receiving, by a processor, a variable affecting an internal gas temperature of a tire, calculating, by the processor, an estimated internal gas temperature of a tire, and determining, by the processor, whether a tire is appropriate to at least one of inflate and deflate.

Additionally, this disclosure includes systems and methods that can indicate whether maintenance of the tire pressure is necessary or desirable and/or can indicate that no maintenance is necessary or desirable based on various data provided, such as a scheduled route.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice various embodiments disclosed herein, it should be understood that other embodiments may be realized and that logical, chemical and mechanical changes may be made without departing from the spirit and scope of this disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

Figure 1:
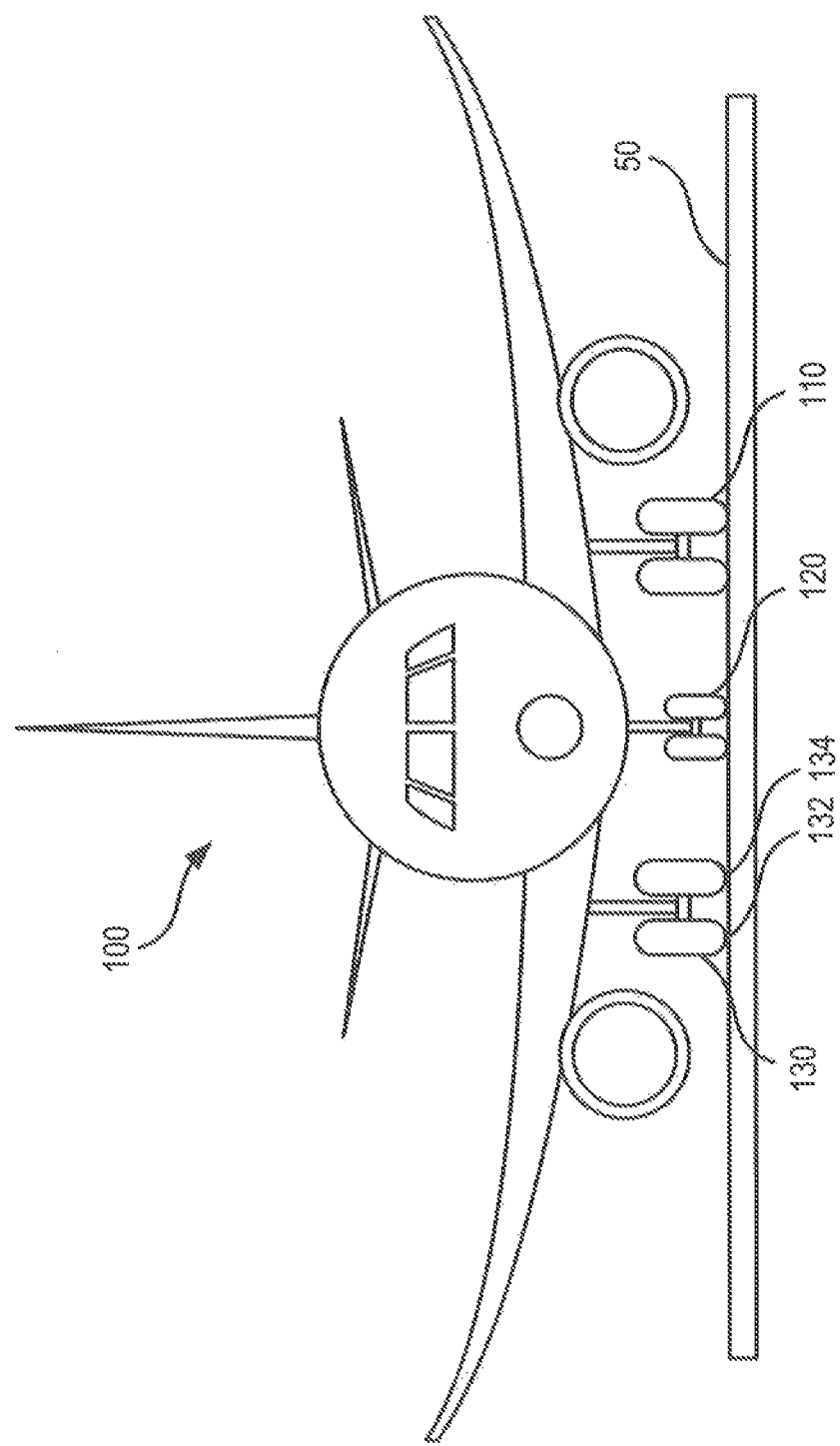
FIG. 1 illustrates, in accordance with various embodiments, a front view of an aircraft on the ground.
Figure 2:
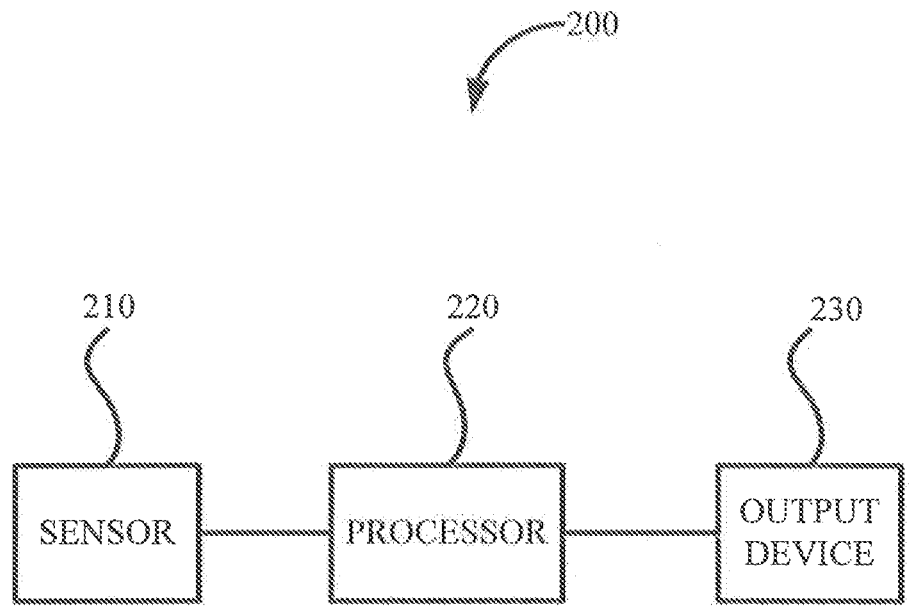
FIG. 2 illustrates various components of an indication system for the appropriate inflation and/or deflation of tires, in accordance with various embodiments.

With reference to FIGS. 1 and 2, an aircraft may comprise one or more types of aircraft wheel and brake assemblies. FIG. 1 illustrates a front view of an aircraft 100 on ground 50 according to various embodiments. Aircraft 100 may comprise landing gear including left main landing gear ("LMLG") 110, nose landing gear ("NLG") 120, and right main landing gear ("RMLG") 130. Though a t-gear type landing gear aircraft is depicted, it should be appreciated that the concepts described herein are applicable to aircraft having multiple axle pairs per gear and aircraft with more than two gears. Each gear may comprise two wheels. For example, RMLG 130 comprises right outboard wheel 132 and right inboard wheel 134. However, in various embodiments, aircraft 100 may comprise any number of gears and each gear may comprise any number of wheels. Additionally the concepts disclosed herein variously apply to two wheel aircraft (e.g. one wheel for each main landing gear). Aircraft tires are typically filled with nitrogen gas, though other gases and combinations of gases are contemplated herein, such as air, carbon dioxide, noble gases, and the like.

Maintaining proper tire pressure tends to prolong tire life and to improve the safe operation of an aircraft. However, as ambient and operational environments change, conditions may render inflation or deflation of a tire unsuitable for a period of time. As the ideal gas law reveals, $PV=nRT$, where P is the pressure of a gas, V is the volume of the gas, n is the molar amount of gas, R is the universal gas constant and T is the temperature of the gas. Accordingly, given a substantially constant volume, the molar amount of a gas and temperature must be controlled to prevent over inflation and under inflation. An aircraft may experience wide ambient temperature differences in a given day, in addition, heat generated during aircraft braking, turning, and rolling on the ground adds heat to a wheel and tire. In that regard, though the temperature of gas within a tire is typically not directly measured, other temperature sensors on or near a wheel and brake assembly may be used to estimate the temperature of the gas within a tire. Management of these conditions, among others, may provide improved tire inflate/deflate safety and maintenance indication systems that determine whether the tire is appropriate to at least one of inflate and deflate. As used herein, the term "appropriate to at least one of inflate and deflate" or "appropriate for inflation and/or deflation" may refer to suitable or proper circumstances for the inflation or deflation of a tire. Suitable or proper circumstances may be influenced by the current tire pressure and other various factors affecting the past, current, or future pressure of a tire. For example, suitable or proper circumstances according to various embodiments may be influenced by weather data of destinations, along a route (e.g., in flight), data of departure locations ambient temperatures, humidity, barometric pressures, altitude, etc.), solar radiation data, temperature data from a brake temperature sensor, tire pressure data (e.g., from a tire pressure monitor and/or inflation pressure heating data), distance traveled on the tire (e.g., data from a rolling distance sensor), surface data (e.g., runway and taxi frictional coefficients), and combinations thereof. Suitable or proper circumstances may be understood to include according to or in compliance with recognized safety and maintenance standards and/or procedures. Standards may include various manufacturer maintenance specifications, governmental regulations, military specifications, or any industrially accepted practices for the proper maintenance of a tire.

In various embodiments, an aircraft may comprise a tire inflate/deflate safety and maintenance indication system. A tire inflate/deflate safety and maintenance indication system 200 may comprise a sensor 210, a processor 220, and an output device 230. In various embodiments, sensor 210 may comprise at least one of the following an ambient temperature sensor, a brake temperature sensor, a tire pressure monitor, a rolling distance sensor, a turning sensor, and combinations thereof. In various embodiments, a processor 220 is in electrical communication and/or radio frequency (RF) communication and/or another form of wireless communication with sensor 210 to process data provided by the sensor 210. In various embodiments, processor 220 may receive input manually (e.g., by a maintenance personnel) and/or can receive data from other sources (e.g., weather data from departure destinations and/or arrival destinations).

Data processed by processor 220 may include weather data of flight destinations, cruising (e.g., flight conditions), and/or preflight departure locations (e.g., ambient temperatures, humidity, barometric pressures, altitude, etc.), solar radiation data, temperature data from a brake temperature sensor, tire pressure data (e.g., from a tire pressure monitor and/or inflation pressure heating data), distance traveled on the tire (e.g., data from a rolling distance sensor), surface data (e.g., runway and taxi frictional coefficients), and combinations thereof.

In various embodiments, the data may consist of historical data, route history, and/or planned future routes. For example, data may comprise the estimated coldest future destination temperature to help ensure that sufficient tire pressure is achieved and maintained for an entire planned itinerary. Additionally, various embodiments may include data of the estimated hottest destination to help prevent overpressure upon landing at a hot destination. Thus, in various embodiments, methods and systems can also indicate whether maintenance of the tire pressure is necessary and/or can indicate that no maintenance is necessary based upon various data provided, such as a scheduled route and associated weather data.

In various embodiments, the processor 220 is in electrical communication and/or RF communication and/or another form of wireless communication with an output device 230. In various embodiments, output device 230 can provide a human readable and/or machine readable output based upon the data provided by processor 220, in various embodiments, the output device 230 may comprise a cockpit panel on the aircraft (e.g., a crew-alert system (CAS)), a maintenance panel on an aircraft, an indicator light on or around the landing gear 130, an indicator light on or around each individual tire (e.g., 132 and 134), an engine-indication and crew-alert system (EICAS), a multifunction display (MFD) and/or any other output device panel. In various embodiments, output device 230 may display an output on a display screen, such as those used by maintenance personnel. The display screen may be part of a computer system and/or a portable device. Such a portable device may comprise a receiver/transceiver in electrical communication and/or RF communication and/or another form of wireless communication with processor 220.

In various embodiments, maintenance logic, flight logic, weather logic, or mixtures thereof can be incorporated into system 200. In various embodiments, the logic can be incorporated into sensor 210. In various embodiments, the logic can be incorporated into processor 220. In various embodiments, the logic can be incorporated into sensor 210 and processor 220.

Figure 3:
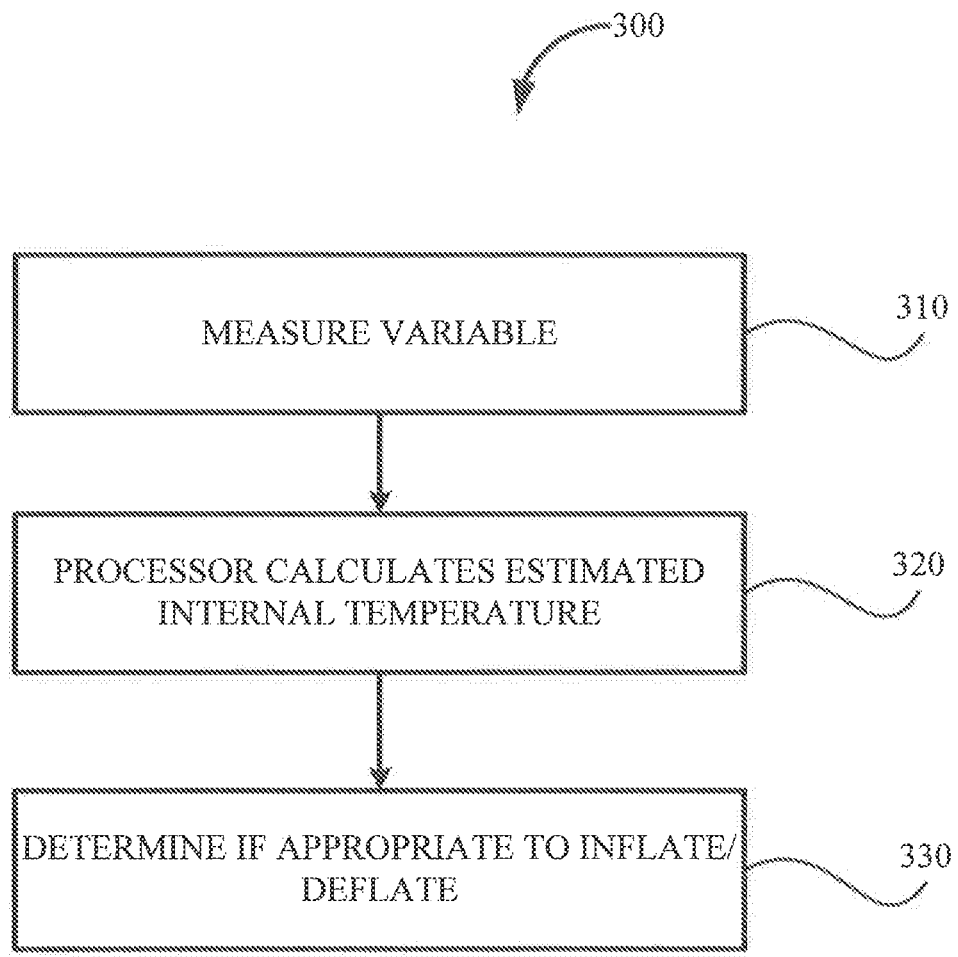
FIG. 3 illustrates a logical flowchart of various operations of a tire inflate/deflate safety and maintenance indication method and/or system, in accordance with various embodiments.

FIG. 3 shows an exemplary maintenance routine 300 as may be performed by an indication system for the inflation and/or deflation of tires, for example, system 200. At least one variable affecting the internal temperature of the gas in a tire is measured (step 310). The measuring of the variable may be done by instrumentation on a vehicle (e.g., brake temperature sensor), may be manually inputted (e.g., manual entry of a frictional coefficient of a contact surface, such as a runway or taxiway), and/or may be received from an external source (e.g., weather data). In various embodiments, a processor 220 calculates an estimated internal temperature of the gas within a tire, the rate of change of the estimated temperature of the gas within a tire, the rate of change of the rate of change of the estimated temperature of the gas within a tire, and/or combinations of the foregoing (step 320).

After processor 220 calculates the estimated internal temperature of the gas within a tire, the rate of change of the estimated temperature of the gas within a tire, the rate of change of the rate of change of the estimated temperature of the internal air and/or gas of a tire, or mixtures thereof, a determination is made as to whether the internal temperature conditions of the air and/or gas of the tire are such that the tire can be appropriately inflated and/or deflated (step 330). In various embodiments, the determination of whether the conditions of the estimated internal temperature of gas within a tire is appropriate for inflation and/or deflation of the tire can be made by a human viewing the calculated values of a processor, may be made by a processor, or a combination thereof.

For example, in various embodiments, the values can be outputted to a display screen where a human may determine, based on experience or a set of predetermined values, that the conditions of the estimated internal temperature of the gas within a tire is appropriate for inflation and/or deflation. In various embodiments, the processor may compare the estimated internal temperature from step 320 against a set of stored data resident in a tangible, non-transitory memory to determine whether the estimated internal temperature of the gas within a tire is appropriate for inflation and/or deflation in step 330. In various embodiments, the processor may send the determination to an output.

Moreover, in some embodiments, steps 310 through 330 may be continually repeated or may be repeated for a determined amount of time.

Figure 4:
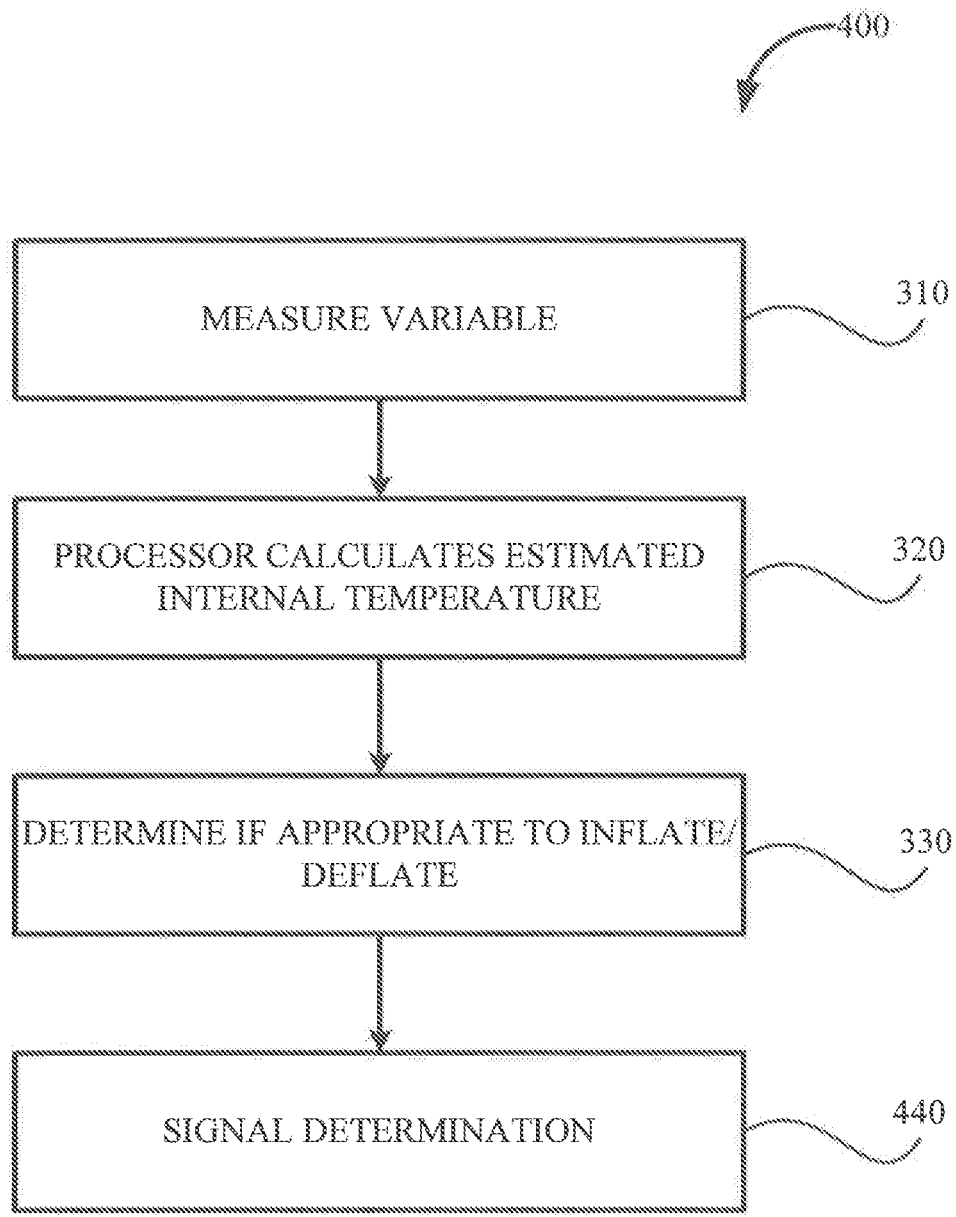
FIG. 4 illustrates a logical flowchart of various operations of a tire inflate/deflate safety and maintenance indication method and/or system, in accordance with various embodiments.

FIG. 4 shows a logical flowchart which illustrates various steps of an indication method and/or the steps performed by an indication system for the inflation and/or deflation of tires, for example, system 200, for the inflation and/or deflation of tires 400. In various embodiments indication method may include outputting the determination of whether the estimated internal temperature of the gas within a tire is appropriate for inflation and/or deflation to an output device (step 440). For example, in various embodiments an output device can provide a human readable output based on the determination. In various embodiments, the output device may comprise a cockpit panel on the aircraft (e.g., a crews alert system (CAS)), a maintenance panel on an aircraft, an indicator light on or around the landing gear, an indicator light on or around each individual tire, and/or an engine-indication and crew-alert system (EICAS), or a multifunction display (MFD) or any other output device panel. In various embodiments, an output device may comprise an output on a computer screen and/or a portable device, such as a receiver or transceiver carried by maintenance personnel, for example, a maintenance data receiver in electromagnetic or wired communication with processor.

In various embodiments, steps 310, 320, 330, and 440 may be continuously repeated, may repeat after an interval of time (e.g., every 30 seconds), may be manually controlled (e.g., by maintenance personnel), may be started after a particular event (e.g., the landing of an aircraft), and/or may be started when the estimated internal temperature of the gas within a tire, the rate of change of the estimated temperature of the gas within a tire, and the rate of change of the rate of change of the estimated temperature of the gas within a tire, reach certain thresholds (e.g., when the estimated temperature of the internal air and/or gas of a tire exceeds 120° F./48° C., exceeds 130° F./54° C., or exceeds 150° F./60° C.).

Figure 5:
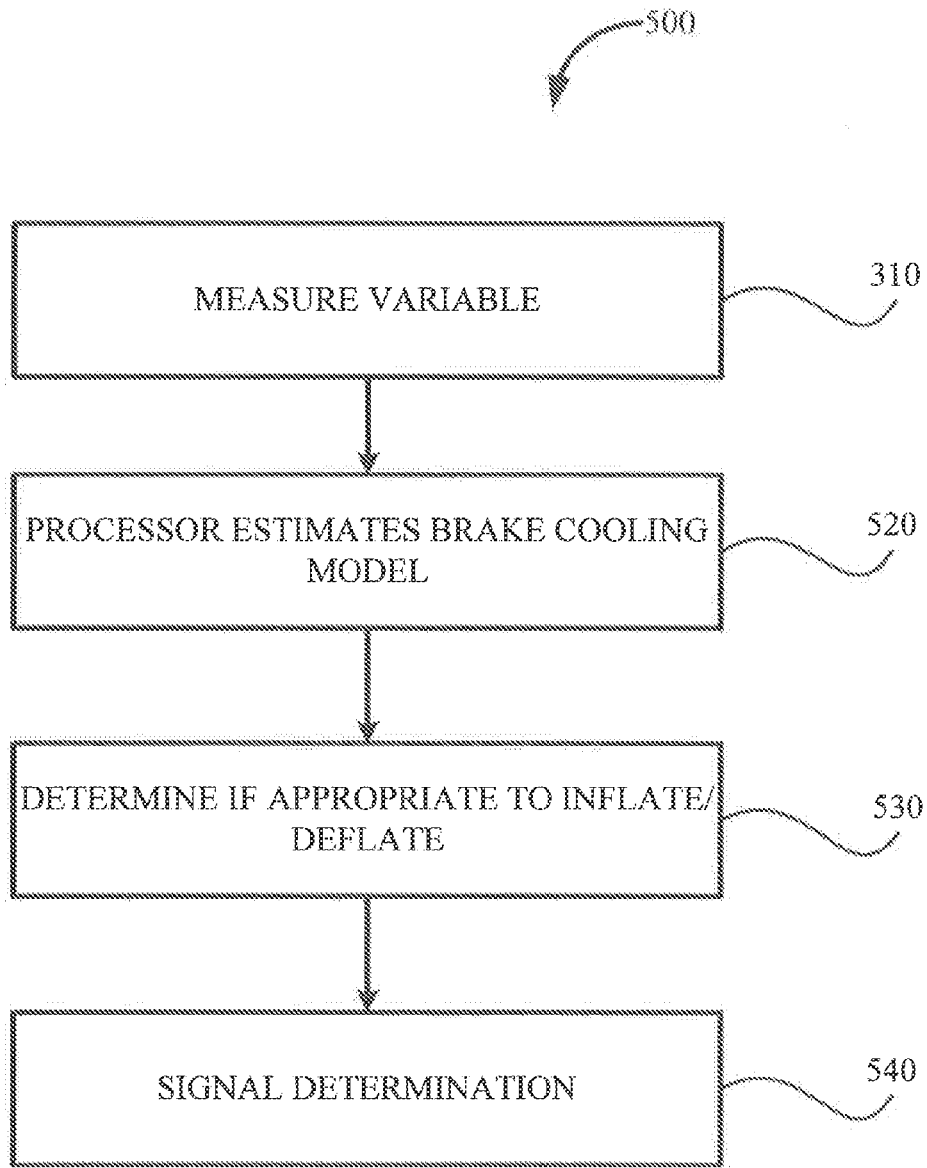
FIG. 5 illustrates a logical flowchart of various steps of a tire inflate/deflate safety and maintenance indication system, in accordance with various embodiments.

FIG. 5 illustrates a maintenance routine 500 according to various embodiments. First, a variable affecting the internal temperature of the gas within a tire is measured (step 310). Then, in various embodiments, a processor calculates a brake cooling model (step 520). The brake cooling model uses ambient temperature, brake type, and other data to determine an estimated cooling profile over time. For example, a brake cooling model may be capable of receiving an aircraft wheel temperature and predicting the wheel temperature at a given point in the future, such as fifteen minutes, thirty minutes, an hour and the like. In various embodiments, a decision of whether it is appropriate to inflate and/or deflate the tire is made (step 530). If it is determined that it is not appropriate to inflate and/or deflate, a value indicative of the same may be set (step 540). Steps 310, 520, and 530 can be repeated until the step 530 results in a determination that it is appropriate to inflate/deflate a tire. In response to step 530 resulting in a determination that it is appropriate to inflate/deflate a tire, a value indicative of the same may be set (step 540). In various embodiments, maintenance routine 500 may continue to monitor the tire to ensure conditions remain appropriate (e.g., while a tire is being inflated) even after a determination that it is appropriate to inflate/deflate a tire is made.

In various embodiments, the indication that it is appropriate to inflate and/or deflate a tire may comprise an absence of an inappropriate indication. For example, in various embodiments, an indication that it is inappropriate to inflate and/or deflate a tire may be sent to an output device. The output device may comprise an indicator light that turns on in response to an indication that it is inappropriate to inflate and/or deflate the tire and off in response to an indication that it is appropriate to inflate and/or deflate the tire.

In various some embodiments, the indication that it is not appropriate to inflate and/or deflate a tire may comprise an absence of an appropriate indication. For example, in various embodiments, an indication that it is appropriate to inflate and/or deflate a tire may be sent to an output device. The output device may comprise an indicator light that turns on in response to an indication that it is appropriate to inflate and/or deflate the tire and off in response to an indication that it is inappropriate to inflate and/or deflate the tire. In various embodiments, in the event of a failure of system 200, system 200 may communicate with an output device (e.g., a CAS, EICAS, and MFD) that the system has failed.

As used herein, the meaning of the terra "non-transitory computer-readable medium" should be construed to exclude only those types of transitory computer-readable media which were found in In re Nuijten, 500 F3d 1346 (fed. Cir. 2007) to fall outside the scope of patentable subject matter under 35 U.S.C. §101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for," As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for indicating a tire condition comprising:
   receiving, by a processor from a sensor, a variable affecting an internal gas temperature of a tire;
   calculating, by the processor, an estimated internal gas temperature of the tire based on the variable;
   determining, by the processor, whether the tire is appropriate to at least one of inflate or deflate, based on the estimated internal gas temperature of the tire;
   displaying, on an output device, a value indicative of whether the tire is appropriate to at least one of inflate and deflate.

2. The method according to claim 1, wherein the variable affecting the internal gas temperature of the tire includes at least one of a distance traveled on a surface, a frictional coefficient of the surface, a brake temperature, and an ambient temperature.

3. The method according to claim 2, wherein the ambient temperature includes at least one of a preflight ambient temperature, an ambient flight temperature, and a post-flight ambient temperature.

4. The method according to claim 1, further comprising that the receiving, calculating, and determining are repeated until a determination that it is appropriate to at least one of inflate and deflate the tire is given.

5. The method according to claim 1, wherein the output device is in at least one of electrical communication and RF communication with the processor.

* * * * *